(12) United States Patent
Broker et al.

(10) Patent No.: US 11,441,806 B2
(45) Date of Patent: Sep. 13, 2022

(54) SYSTEMS AND METHODS FOR WIRELESSLY CONFIGURING CLIMATE CONTROL SYSTEM CONTROLS

(71) Applicant: Emerson Electric Co., St. Louis, MO (US)

(72) Inventors: John F. Broker, Warrenton, MO (US);
Mike J. Moran, St. Louis, MO (US);
Nayan J. Mishra, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 17/199,902

(22) Filed: Mar. 12, 2021

(65) Prior Publication Data

US 2021/0285675 A1    Sep. 16, 2021

Related U.S. Application Data

(60) Provisional application No. 62/988,683, filed on Mar. 12, 2020.

(51) Int. Cl.
*H04B 5/00* (2006.01)
*G05B 15/02* (2006.01)
*F24F 11/56* (2018.01)
*F24F 11/30* (2018.01)
*F24F 11/74* (2018.01)
*F24F 11/64* (2018.01)

(52) U.S. Cl.
CPC .............. *F24F 11/56* (2018.01); *F24F 11/30* (2018.01); *F24F 11/64* (2018.01); *F24F 11/74* (2018.01); *G05B 15/02* (2013.01); *H04B 5/0031* (2013.01); *G05B 2219/2614* (2013.01)

(58) Field of Classification Search
CPC .. F24F 11/56; F24F 11/30; F24F 11/64; F24F 11/74; F24F 11/77; F24F 11/86; G05B 15/02; G05B 2219/2614; H04B 5/0031; Y02B 30/70
See application file for complete search history.

(56) References Cited

U.S. PATENT DOCUMENTS

| 2017/0294825 | A1* | 10/2017 | Waikar | H02K 11/33 |
|---|---|---|---|---|
| 2018/0363934 | A1* | 12/2018 | Vie | F24F 11/52 |
| 2020/0228527 | A1* | 7/2020 | Lu | H04L 12/283 |
| 2021/0266712 | A1* | 8/2021 | Magnavacca | H04W 4/38 |

* cited by examiner

*Primary Examiner* — Michael W Choi
(74) *Attorney, Agent, or Firm* — Armstrong Teasdale LLP

(57) ABSTRACT

An HVAC system includes a motor having a plurality of speeds at which it can operate, an HVAC control, and a mobile device. The HVAC control is configured to control the motor during a plurality of different operations, and includes a controller processor, a controller memory, and controller near field communication (NFC) wireless interface including an NFC processor, an NFC memory, and an antenna. The mobile device includes a user interface and a mobile NFC wireless interface configured. The mobile device is configured to display the plurality of different operations on the user interface, receive user input settings of speeds of the motor for each of the plurality of different operations, and wirelessly transmit the received user input settings to the controller NFC wireless interface of the HVAC control. The NFC processor is configured to store the received user input settings in the NFC memory.

17 Claims, 12 Drawing Sheets

| OEM | Defrost Type | Defrost Cycle Time | Short Cycle Time | RV Power | RV Shift Delay | Max Defrost Time | Defrost Enable Coil Temp | Defrost Terminate Coil Temp |
|---|---|---|---|---|---|---|---|---|
| C nnnn | T/T | 90 min | 5 min | 0 | 0 sec | 10 min | 30° | 65° |
| G bbbb | T/T | 80 min | 5 min | 0 | 30 sec | 10 min | 35° | 70° |
| Lxxxx | Demand | n/a | 5 min | 0 | 30 sec | 14 min | 35° | 50° |
| Tyyyy | Demand | n/a | 0 min | 0 | 12 sec | 14 min | 35° | 50° |
| Rzzzz | Demand | n/a | 5 min | 8 | 30 sec | 14 min | 35° | 70° |
| Ykkkk | Demand | n/a | 5 min | 0 | 30 sec | 8 min | 31° | 80° |
| Nmmmm | Demand | n/a | 3 min | 0 | 30 sec | 14 min | 35° | 70° |
| Factory Default | Demand | n/a | 5 min | 0 | 30 sec | 14 min | 35° | 70° |

FIG. 5

| Set-Up Feature | Set-Up Details | |
|---|---|---|
| Display Orientation | Rotates the Display for Easy Viewing | |
| Error | Displays Current System Errors. | |
| Fault Recall | Displays Stored System Errors. | |
| Quick Set up by OEM | Selects | |
| | Cnnnn (1) | Rzzzz (5) |
| | Gbbbb (2) | Ykkkk (6) |
| | Lxxxx (3) | Nmmmm (7) |
| | Tyyyy (4) | Default (8) |
| Defrost Type | Selects Demand Defrost or Timed Temperature Defrost. | |
| Enable Temperature | Selects Coil Temperature (degrees F) Allowing Timed / Temperature or Demand Defrost to Accumulate Run Time. Above this Temperature a Defrost Cycle will not Occur. | |
| Termination Temperature | Selects Desired Coil Temperature to Terminate Defrost Cycle (degrees F) | |
| Defrost Cycle Time (Timed / Temp Defrost only) | Selects Accumulated Compressor Run Time (minutes) before Entering Defrost Mode. (Appears for Timed Temperature Defrost Systems Only). | |
| Short Cycle Time | Selects Minimum Time Delay (minutes) between Cycles. | |
| Reversing Valve Power | "O" Selection Energizes Reversing Valve in Cool, "B" Energizes Reversing Valve in Heat (B). | |
| Reversing Valve Shift Delay Time | Selection Limits Excessive Noise In and Out of a Defrost Cycle (in seconds). | |

FIG. 6A

| Set-Up Feature | Set-Up Details |
|---|---|
| Maximum Defrost Time | Selection Limits Maximum Defrost Time (Minutes) |
| Auxiliary Heat Lockout | Settings Allow the Control to Act as an Outdoor Thermostat to Prevent Auxiliary Heat from Coming on Until the Outdoor Temperature Drops to the Selected Temperature (Degrees F). |
| Low Temp Compressor Cutout | Settings Allow the Control to Act as an Outdoor Thermostat to Turn off the Heat Pump and Use Only Auxiliary Heat when it's Too Cold for the Pump to Operate Efficiently (Degrees F). |
| Brownout Random Time Start Delay | "On" Selects a 5 to 90 Second Random Time Start Delay After a Brownout |
| Low Pressure Switch | Accommodates Systems with or without a Low Pressure Switch - if the System Does not Have a Low Pressure Switch to "off" |
| High Pressure Switch | Accommodates Systems with or without a High Pressure Switch - if the System Does not Have a High Pressure Switch to "off" |
| 24V Brownout Protection | "On" Turns Off the Compressor and Fan if Low Voltage Drops Below 15.5VAC. |

FIG. 6B

|  | 13:52 | ⏱ ✱ 42% 🔋 |
|---|---|---|
| 📶 | Settings |  |
|  | Connected |  |

SYSTEM SETTINGS

| Defrost Type | Demand › |
|---|---|
| Reversing Valve Power | 0 › |
| Random Start Delay Time | ⬤◯ |
| Low Pressure Switch | ⬤◯ |
| High Pressure Switch | ⬤◯ |
| 24V Brownout Protection | ◯⬤ |

TEMPERATURE SETTINGS

| Enable Temperature | 35 F › |
|---|---|
| Termination Temperature | 70 F › |
| Supplemental Heat Lockout | Off › |
| Low Temp Compressor Cutout | Off › |

TIME SETTINGS

| Defrost Cycle Time | N/A |
|---|---|
| Short Cycle Time | 5 Min › |
| Reversing Valve Shift Delay | 30 Sec › |
| Maximum Defrost Cycle | 14 Min › |

SPECIAL SETTINGS

| Display Orientation | Hi › |
|---|---|

Configure

SYSTEMS AND METHODS FOR WIRELESSLY CONFIGURING CLIMATE CONTROL SYSTEM CONTROLS

CROSS-REFERENCE TO RELATED APPLICATION

This application claims priority to U.S. Provisional Patent Application No. 62/988,683 filed Mar. 12, 2020, the entire disclosure of which is hereby incorporated by reference in its entirety.

FIELD

The field of the disclosure relates to climate control systems, and more particularly, to systems and methods for wirelessly configuring controls for climate control systems.

BACKGROUND

Control boards for climate control systems, such as heating ventilation and air conditioning (HVAC) equipment, units, systems, etc., including but not limited to furnaces, heat pumps and air handlers, are becoming increasingly complex. Conventional furnace, heat pump and air handler units typically have to be opened up in order to access control boards, to access fault and/or operational data, and/or to change configuration settings. It can be difficult for a service technician or other user to configure HVAC controls via dipswitches, push buttons and/or LEDs, which can be difficult for the user to read, understand and execute correctly, particularly in dark and confined spaces that can be very hot or very cold. Blinking LED fault codes can be misread and misinterpreted.

For units in need of replacement HVAC controls, it often can be difficult to configure a replacement for a control that has a large number of options. A large number of possible options also can make it difficult to provide a universal control for such units. Many conventional interfaces for installing replacement HVAC controls require an installer to understand the settings of an old control and to manually set them for a replacement control.

Further, configuring control boards frequently requires that the control board be powered. Thus, such control boards typically cannot be configured until after the control board is installed in the system, which may place the control board in a location that is difficult to access or that is uncomfortable for the installer.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, an HVAC system includes a motor having a plurality of speeds at which it can operate, an HVAC control, and a mobile device. The HVAC control is configured to control the motor during a plurality of different operations, and includes a controller processor, a controller memory, and controller near field communication (NFC) wireless interface including an NFC processor, an NFC memory, and an antenna. The mobile device includes a user interface and a mobile NFC wireless interface configured. The mobile device is configured to display the plurality of different operations on the user interface, receive user input settings of speeds of the motor for each of the plurality of different operations, and wirelessly transmit the received user input settings to the controller NFC wireless interface of the HVAC control. The NFC processor is configured to store the received user input settings in the NFC memory.

Another aspect is an HVAC system including at least one HVAC component, an HVAC control, and a mobile device. The HVAC control is configured to control the at least one HVAC component according to one or more HVAC system configuration parameters. The HVAC control includes a controller processor, a controller memory, and controller near field communication (NFC) wireless interface. The controller NFC wireless interface includes an NFC processor, an NFC memory, and an antenna. The mobile device includes a user interface, a camera, and a mobile NFC wireless interface configured for wireless communication with the controller NFC wireless interface of the HVAC control when the mobile NFC wireless interface is in close proximity to the controller NFC wireless interface. The mobile device is configured to obtain an identity of the HVAC control which identity is determined by parsing an image of a label of the HVAC control as captured by the camera or by receiving a model number of the HVAC control entered into the user interface. The mobile device is configured to determine default settings for the one or more HVAC system configuration parameters based on the identified HVAC control to be wirelessly transmitted to the controller NFC wireless interface of the HVAC control. The NFC processor is configured to store the received settings for the one or more HVAC system configuration parameters in the NFC memory to permit the HVAC control to control the at least one HVAC component according to the received settings for the one or more HVAC system configuration parameters.

Another aspect is an HVAC system including at least one HVAC component, an HVAC control, and a mobile device. The HVAC control is configured to control the at least one HVAC component according to one or more HVAC system configuration parameters. The HVAC control includes a controller processor, a controller memory, and controller near field communication (NFC) wireless interface. The controller NFC wireless interface includes an NFC processor, an NFC memory, and an antenna. The mobile device includes a user interface, a camera, and a mobile NFC wireless interface configured for wireless communication with the controller NFC wireless interface of the HVAC control when the mobile NFC wireless interface is in close proximity to the controller NFC wireless interface. The mobile device is configured to display the one or more HVAC system configuration parameters on the user interface, receive user input settings for the one or more HVAC system configuration parameters, and wirelessly transmit the received user input settings for the one or more HVAC system configuration parameters to the controller NFC wireless interface of the HVAC control. The NFC processor is configured to store the received user input settings for the one or more HVAC system configuration parameters in the NFC memory to permit the HVAC control to control the at least one HVAC component according to the received user input settings for the one or more HVAC system configuration parameters when the NFC processor determines that the mobile device is permitted to store data to the NFC memory. The NFC processor is configured not to store the received user input settings for the one or more HVAC system configuration parameters in the NFC memory when the NFC processor determines that the mobile device is permitted to store data to the NFC memory.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 5 is an example table of original equipment manufacturers (OEMs) of defrost controls and corresponding defrost control parameters for each OEM.

FIGS. 6A-6B describe example defrost control set-up features that may be provided as menu choices on a mobile device.

FIGS. 7A-7D are screenshots of example selectable menu items and displayed information.

Like reference symbols in the various drawings indicate like elements.

DETAILED DESCRIPTION

Figure 1:
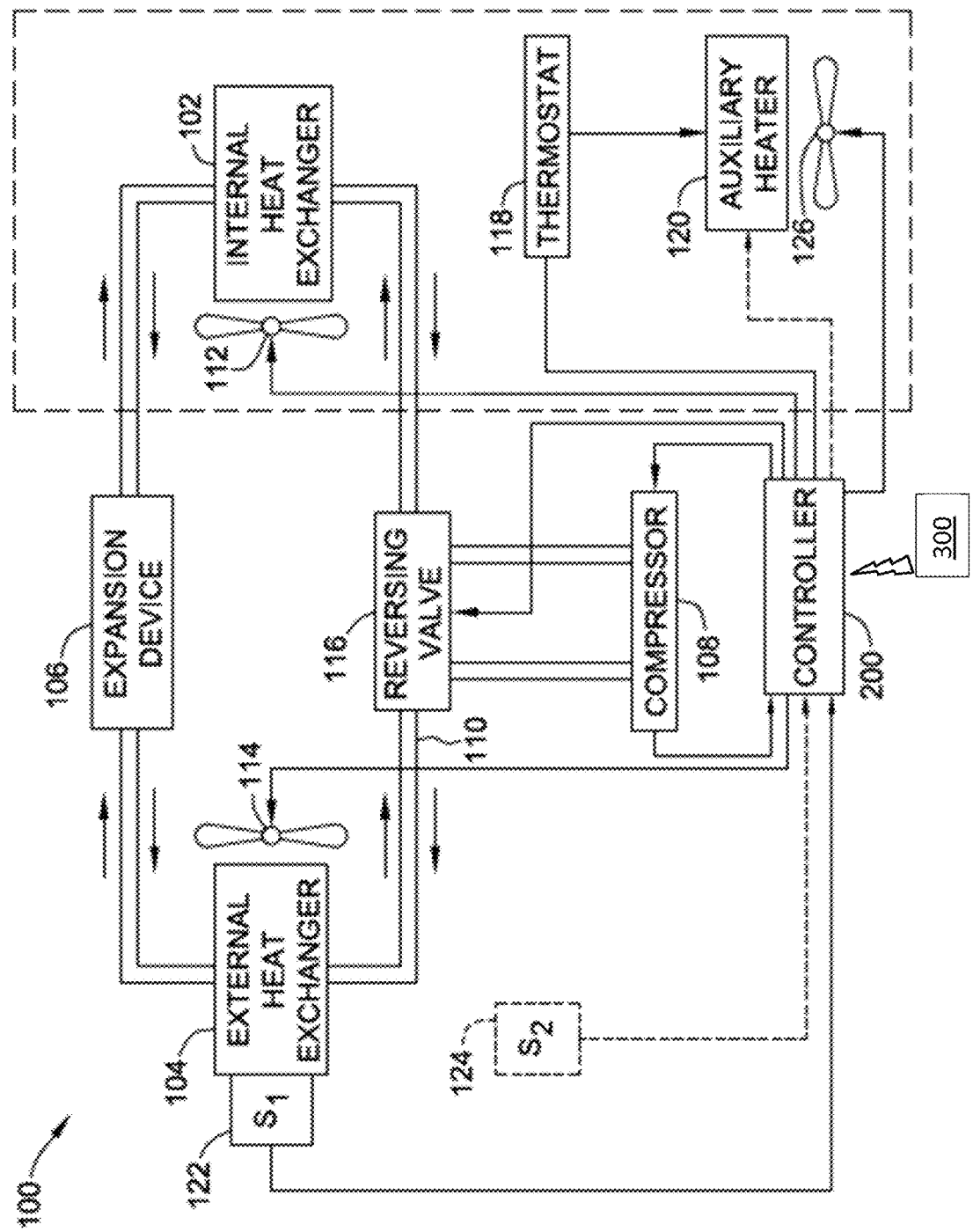
FIG. 1 is a schematic diagram of a heat exchange system including a controller.

Referring to FIG. 1, an example heat exchange system of one embodiment for heating and cooling a temperature controlled environment is indicated generally at 100. The heat exchange system 100 generally includes an internal heat exchanger 102, an external heat exchanger 104, an expansion device 106 fluidly connected between the heat exchangers 102, 104, and a compressor 108. The external heat exchanger 104, the expansion valve 106, the internal heat exchanger 102, and the compressor 108 are connected in fluid communication by conduits 110.

Refrigerant is circulated through the system 100 by the compressor 108. An internal blower 112 (also sometimes referred to as a circulator) which includes a fan or impeller driven by a motor, forces air from the temperature controlled environment into contact with the internal heat exchanger 102 to exchange heat between the refrigerant and the temperature controlled environment. The internal blower 112 subsequently forces the air back into the temperature controlled environment. Similarly, an external blower 114, which includes a fan or impeller driven by a motor, forces air from an ambient environment into contact with the external heat exchanger 104, and subsequently back into the ambient environment. The direction of refrigerant flow is controlled by a reversing valve 116 fluidly connected between the compressor 108 and each heat exchanger 102, 104.

The operation of the system 100 is generally controlled by a controller 200 (sometimes referred to as an HVAC control) and a thermostat 118 coupled to the controller 200. The thermostat 118 is coupled to one or more temperature sensors (not shown) for measuring the temperature of the temperature controlled environment. The controller 200 is coupled to the reversing valve 116, the compressor 108, and the blowers 112, 114 for controlling operation of the components in response to control signals received from the thermostat 118 and for controlling operation of the components during defrost cycles.

The system 100 also includes an auxiliary heater 120 coupled to the controller 200 and the thermostat 118. The auxiliary heater 120 is configured to supply additional heat to the system 100 when the system is in a heating mode and/or to supply heat to the temperature controlled environment when the system 100 is in a defrost mode. In alternative embodiments, the auxiliary heater 120 is omitted from the system 100.

The system 100 also includes sensors 122, 124 for monitoring environmental conditions of the system 100. Sensors 122, 124 are coupled to the controller 200 for relaying information about the system 100 to the controller 200 in the form of electrical signals. In the illustrated embodiment, sensors 122, 124 are temperature sensors. The system 100 may include additional or alternative sensors, such as photo-optical sensors, pressure sensors, tactile sensors, and refrigerant pressure sensors.

In operation, the compressor 108 receives gaseous refrigerant that has absorbed heat from the environment of one of the two heat exchangers 102, 104. The gaseous refrigerant is compressed by the compressor 108 and discharged at high pressure and relatively high temperature to the other heat exchanger. Heat is transferred from the high pressure refrigerant to the environment of the other heat exchanger and the refrigerant condenses in the heat exchanger. The condensed refrigerant passes through the expansion device 106, and into the first heat exchanger where the refrigerant gains heat, is evaporated and returns to the compressor intake.

The controller 200 is wirelessly connectable with a mobile device 300, such as a smart phone, tablet, laptop, etc., (hereinafter referred to as "mobile device.") The mobile device 300 has a processor and memory that includes and/or has access to a software application executable to configure the controller 200 as further described below. The mobile device 300 also has a display, such as a touchscreen and, in various embodiments, a voice processing capability.

Figure 2:
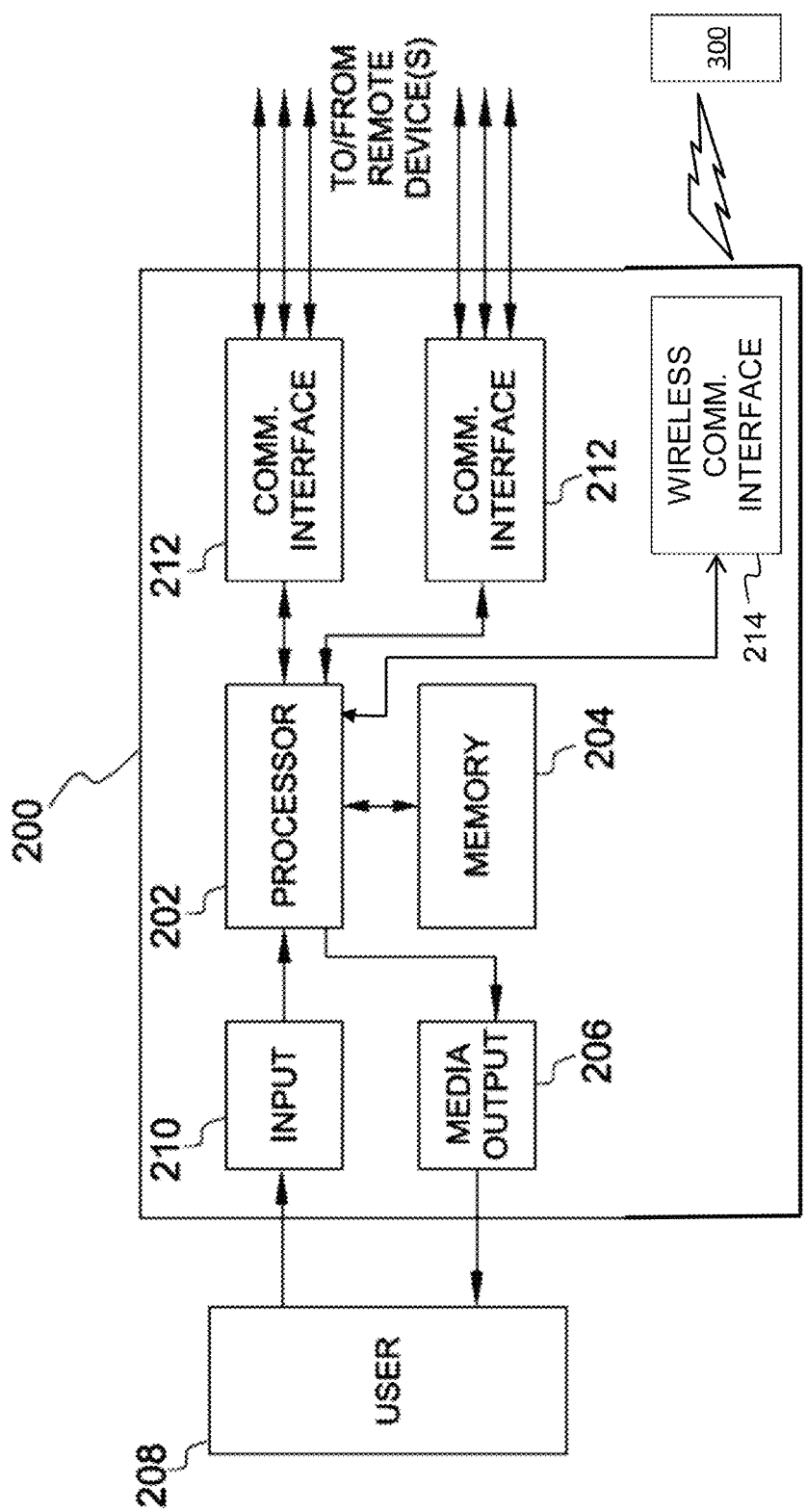
FIG. 2 is a block diagram of the controller of FIG. 1.

FIG. 2 is an example configuration of the controller 200 for use in the system 100. The controller 200 includes a processor 202, a memory 204, a media output component 206, an input device 210, wired communications interfaces 212, and wireless communications interface 214. Other embodiments include different components, additional components, and/or do not include all components shown in FIG. 2.

The processor 202 is configured for executing instructions. In some embodiments, executable instructions are stored in the memory 204. The processor 202 may include one or more processing units (e.g., in a multi-core configuration). The memory 204 is any device allowing information such as executable instructions and/or other data to be stored and retrieved. The memory 204 may include one or more computer-readable media. In some embodiments, the processor 202 and the memory 204 are both embodied in a microcontroller, while in other embodiments the processor 202 and the memory 204 are separate components.

The media output component 206 is configured for presenting information to a user 208. The media output component 206 is any component capable of conveying information to the user 208. In some embodiments, the media output component 206 includes an output adapter such as a video adapter and/or an audio adapter. The output adapter is operatively connected to the processor 202 and operatively connectable to an output device such as a display device (e.g., a liquid crystal display (LCD), organic light emitting diode (OLED) display, cathode ray tube (CRT), "electronic ink" display, one or more light emitting diodes (LEDs)) or an audio output device (e.g., a speaker or headphones).

The controller 200 includes, or is connected to, the input device 210 for receiving input from the user 208. The input device is any device that permits the controller 200 to receive analog and/or digital commands, instructions, or other inputs from the user 208, including visual, audio, touch, button presses, stylus taps, etc. The input device 210 may include, for example, a variable resistor, an input dial, a keyboard/keypad, momentary push button/buttons, a pointing device, a mouse, a stylus, a touch sensitive panel (e.g., a touch pad or a touch screen), a gyroscope, an accelerometer, a position detector, or an audio input device. A single component such as a touch screen may function as both an output device of the media output component 206 and the input device 210.

The memory 204 stores computer-readable instructions for control of the system 100 as described herein. In some embodiments, the memory area stores computer-readable instructions for providing a user interface to the user 208 via media output component 206 and, receiving and processing input from input device 210. The memory 204 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

The communication interfaces 212 enable the controller 200 to communicate with remote devices and systems, such as sensors, valve control systems, safety systems, remote computing devices, and the like. The communication interfaces 212 may be wired or wireless communications interfaces that permit the computing device to communicate with the remote devices and systems directly or via a network. Wireless communication interfaces 212 may include a radio frequency (RF) transceiver, a Bluetooth® adapter, a Wi-Fi transceiver, a ZigBee® transceiver, an infrared (IR) transceiver, and/or any other device and communication protocol for wireless communication. (Bluetooth is a registered trademark of Bluetooth Special Interest Group of Kirkland, Wash.; ZigBee is a registered trademark of the ZigBee Alliance of San Ramon, Calif.) Wired communication interfaces 212 may use any suitable wired communication protocol for direct communication including, without limitation, USB, RS232, I2C, SPI, analog, and proprietary I/O protocols. In some embodiments, the wired communication interfaces 212 include a wired network adapter allowing the computing device to be coupled to a network, such as the Internet, a local area network (LAN), a wide area network (WAN), a mesh network, and/or any other network to communicate with remote devices and systems via the network.

The wireless communication interface 214 is a near field communication (NFC) transceiver operable for wireless communication with a nearby NFC communication enabled remote device, such as mobile device 300, and is referred to sometimes herein as the NFC wireless interface. The NFC wireless interface includes an NFC chip and an NFC antenna (not separately illustrated). The NFC chip includes its own memory. In the example, the NFC chip memory is $E^2$ memory. In other embodiments, the memory may be any other suitable type of memory. The NFC wireless interface 214 is in communication with the processor 202 and the processor can read and write information from/to the memory of the NFC wireless interface 214.

Information may be retrieved from the memory of the NFC wireless interface 214 of the controller 200 or transmitted to the NFC wireless interface 214 of the controller 200 using the wireless communication interface 214 when the controller 200 is powered on and/or when it is powered off. Because NFC communication requires that the communicating transceivers be in close proximity (e.g., about one inch apart or closer), the mobile device 300 and the controller 200 may only communicate via NFC when the mobile device 300 is in close proximity to the controller 200. Thus, the user/installer may input into the mobile device 300 or the mobile device may select settings or other data to be provided to the controller 200 (e.g., the user may configure the system 100) when the mobile device 300 is not in close proximity to the controller 200 (and thus not communicating with the controller 200), and then place the mobile device 300 in close proximity to the controller 200 to establish communication and transmit the information from the mobile device 300 to the controller 200. References to communicating via NFC or being in communication with a device via NFC herein refers to being in communication when in close proximity to each other.

When the controller 200 is turned off and data is transmitted to the controller using the NFC wireless interface 214, the data is stored in the memory of the NFC wireless interface 214. When the controller 200 is powered on, the data stored in the memory of the NFC wireless interface 214 may be copied to the memory 204 for use by the processor 202, or may be left in the memory of the NFC wireless interface 214 and used by the processor 214 without copying to the memory 204. For example, the processor 202 may copy new operational parameters stored in the memory of the NFC wireless interface 214 and replace the corresponding operational parameter settings in the memory 204. When the controller 200 is powered, data may be transmitted to the controller 200 using the NFC wireless interface 214 and stored in the memory 204 directly, or stored in the memory of the NFC wireless interface 214 and then copied to the memory 204.

In the example embodiment, the controller 200, and more specifically the NFC wireless interface 214, determines if a user is permitted to store data to the memory of the NFC wireless interface 214. In the example embodiment, this is achieved by password protecting storage to the memory of the NFC wireless interface 214. The password is stored in the memory of the NFC wireless interface 214 as an HVAC control password. Any mobile device can receive information from the controller 200 about the controller 200, such as model number, serial number, operational statistics, fault data, installer name, installation date, and the like, without needing a password. In order to store information to the memory of the NFC wireless interface 214, such as operational setting, the mobile device must transmit a matching mobile device password to the controller 200 over the NFC connection. Thus, the controller 200 is configured to store configuration parameters from the mobile device only when the NFC wireless interface 214 determines that the mobile device password transmitted to the controller 200 matches the HVAC control password stored in the memory of the NFC wireless interface 214. In other embodiments, no data may be read from the memory of the NFC wireless interface 214 or stored to the memory of NFC wireless interface 214 without the matching password. Alternatively, some data may be able to be saved without a password, while other data may require the password in order to be saved. For example, installer and installation information (e.g., installer name, date of installation, location of the installation, and the like) may be stored to the controller 200 without a password while operational parameters may require a password.

In the example embodiment, the HVAC control password is generated by the controller 200 and stored in the memory of the NFC wireless interface 214. Specifically, the password is generated by the processor 202 and stored in the memory of the NFC wireless interface 214. The memory 204 of the controller 200 includes instructions for generating the HVAC control password. The HVAC control password is generated based on a predetermined identifier of the HVAC controller 200 stored in the memory 204 (for example, when the HVAC controller 200 is manufactured). For example, the password may be based on the serial number of the controller 200, the model number of the controller 200, a part number of the controller 200, a manufacturer identifier of the controller 200, a build date of the controller, a purchase order number, a control PN, or any other suitable identifier. In the example embodiment, the password is generated the first time the HVAC controller 200 is powered up after the predetermined identifiers are stored in the memory 204. In other embodiments, the password may be generated at any other suitable time. In some embodiments, the HVAC control password is equivalent to the identifier. In other embodiments, a predetermined modification is applied to the identifier to arrive at the HVAC control password. For example, two or more of the identifiers may be combined, the order of numbers of the identifier may be rearranged or modified by an arithmetical step, a predetermined additional element may be added to the identifier, or any other suitable modification may be applied to generate the HVAC control password. In other embodiments, the HVAC control password may be a predetermined password stored in the NFC wireless interface 214 not based on any of the identifiers, and each different model of controller 200 may have a different password or they may all share the same predetermined password. In still other embodiments, a checksum is stored in the memory of the NFC wireless interface 214, and the data transmitted to the NFC wireless interface 214 must agree with the checksum stored in the memory of the NFC wireless interface 214. If the data to be stored does not agree with the stored checksum, the NFC wireless interface 214 treats the data the same as when the passwords do not match, and the data is not stored. When the data agrees with the checksum, the NFC wireless interface 214 determines that the user/transmission is permitted to store the data, and the data is stored in the memory of the NFC wireless interface 214.

The mobile device 300 is also configured to generate the HVAC control password, referred to as the mobile device 300 password when created by the mobile device password and transmitted to the controller 200. That is, the mobile device stores instructions for generating the mobile device password based on the predetermined identifier. The mobile device is configured to generate the password using the same identifier(s) as the controller 200 and the same modifications (if any). Thus, once the mobile device 300 receives input of the identification of the controller 200 (as described herein), the mobile device 300 is able to generate the password needed to access and/or store data to the memory of the NFC wireless interface 214. When the HVAC control password is a predetermined password not based on any of the identifiers, the mobile device also stores the appropriate password for the particular controller 200. That is, the mobile device 300 may store or retrieve the predetermined password(s) for the various models of controller 200 or may store/retrieve the password for the particular controller 200 after it is identified. Moreover, in embodiments where the protection is achieved through a checksum stored in the memory of the NFC wireless interface 214, the mobile device is configured to format and transmit the data appropriately to agree with the stored checksum.

In some embodiments, the only communication interface is the NFC transceiver 214. That is, in such embodiments, the controller 200 does not include communications interfaces 212 or other communication interfaces, which may be done to reduce cost. The controller 200 in such embodiments may use relays (not shown) to turn loads on or off, and/or may use other solid state switching means to control loads, like 5 taps of a constant torque motor (CTM).

In other embodiments, the only communication interface for communication between the controller 200 and a remote/mobile device is the NFC transceiver 214. In such other embodiments, communication interfaces 212 may be present, but only for control of or communication with or control of one or more other component of the system 100. In other embodiment, the communication between the controller 200 and a remote/mobile device described herein may be performed using any other suitable wired or wireless communication. For example, in some embodiments, all of the communication between the controller 200 and a remote/mobile device described herein as performed over NFC connection is instead performed over a wired USB connection between the controller 200 and a remote/mobile device 300. In still other embodiments, communication between the controller 200 and a remote/mobile device described herein may be performed over any suitable combination of communications interfaces, whether wired or wireless.

Figure 3:
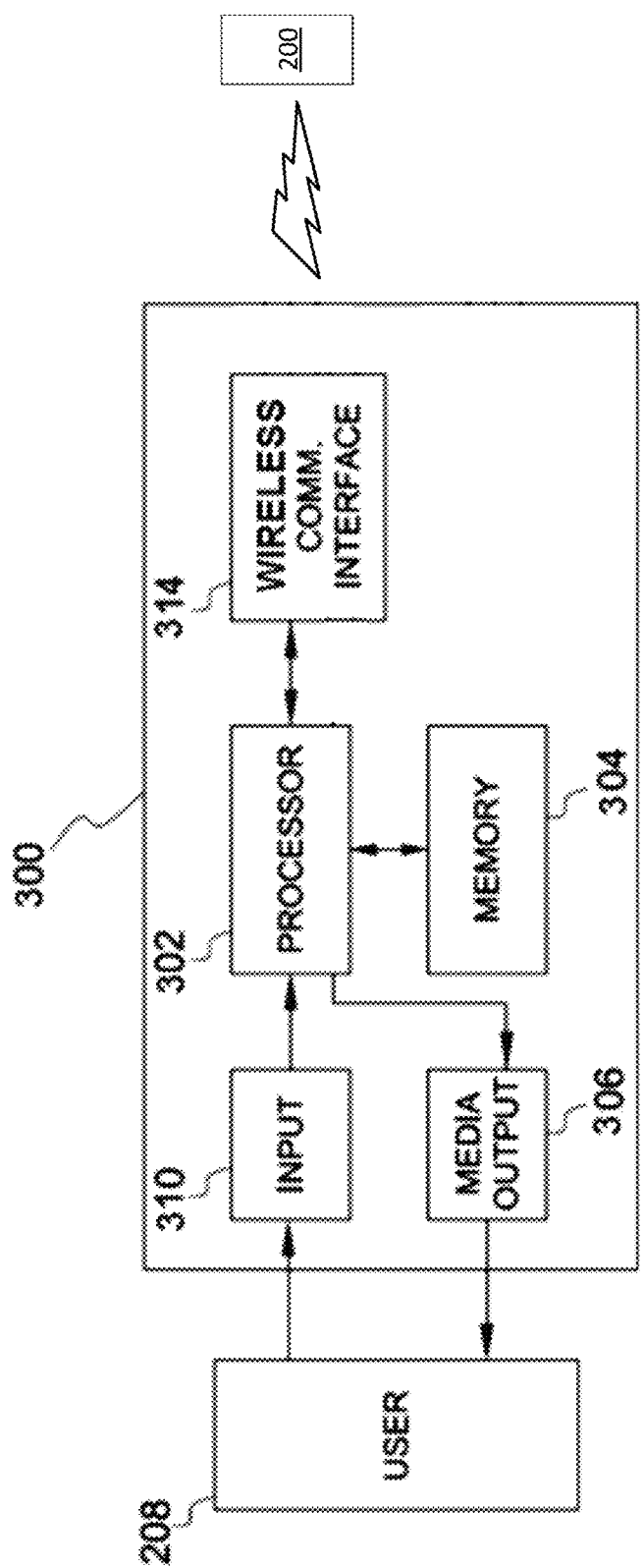
FIG. 3 is a block diagram of a mobile device for use with the system shown in FIG. 1.

FIG. 3 is an example configuration of the mobile device 300 for use with the system 100. The mobile device 300 includes a processor 302, a memory 304, a media output component 306, an input device 310, wired communications interfaces 312, and wireless communications interface 314. Other embodiments include different components, additional components, and/or do not include all components shown in FIG. 3.

The processor 302 is configured for executing instructions. In some embodiments, executable instructions are stored in the memory 304. The processor 302 may include one or more processing units (e.g., in a multi-core configuration). The memory 304 is any device allowing information such as executable instructions and/or other data to be stored and retrieved. The memory 304 may include one or more computer-readable media.

The media output component 306 is configured for presenting information to a user 308. The media output component 306 is any component capable of conveying information to the user 308. In some embodiments, the media output component 306 includes an output adapter such as a video adapter and/or an audio adapter. The output adapter is operatively connected to the processor 302 and operatively connectable to an output device such as a display device (e.g., a liquid crystal display (LCD), organic light emitting diode (OLED) display, cathode ray tube (CRT), "electronic ink" display, one or more light emitting diodes (LEDs)), and/or an audio output device (e.g., a speaker or headphones).

The mobile device 300 includes the input device 310 for receiving input from the user 308. The input device is any device that permits the mobile device 300 to receive analog and/or digital commands, instructions, or other inputs from the user 308, including visual, audio, touch, button presses, stylus taps, etc. The input device 310 may include, for example, keyboard/keypad, a pointing device, a mouse, a stylus, a touch sensitive panel (e.g., a touch pad or a touch screen), a gyroscope, an accelerometer, a position detector, or an audio input device. A single component such as a touch screen may function as both an output device of the media output component 306 and the input device 310.

The memory 304 stores computer-readable instructions for operation of the mobile device 300. The memory 304 also stores computer-readable instructions for configuring and communicating with system 100, and specifically for configuring and communicating with the controller 200. In some embodiments, the memory 304 stores computer-readable instructions for providing a user interface to the user 308 via media output component 306 and, receiving and processing input from input device 310. The memory 304 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory.

The wireless communication interface 314 is a near field communication (NFC) transceiver operable for wireless communication with a nearby NFC enabled device, such as controller 200. Information may be retrieved from controller 200 or transmitted to controller 200 using the wireless communication interface 214 when the controller 200 is powered on and when it is powered off.

The mobile device 300 may be used to communicate with the controller 200 at different times. During production of the control board or before the control board is installed in the system 100 (or any other system), the user 208 may retrieve or create content such as control instructions, default system settings, controller firmware, or the like, and transmit the content to the controller 200 using the NFC wireless communications interfaces 314 and 214 of the mobile device 300 and controller 200. In particular, this permits the controller 200 to be programmed or updated by the manufacturer without powering the controller 200, and permits an installer or system manufacturer to program or update the controller 200 before the controller 200 is installed and without need for powering the controller. Thus, for example, an installer may configure the controller for a particular system installation in the shop, in the installation vehicle, or in any other location, without needing to be near the actual HVAC system and without needing to power the controller. After the controller is installed in the system 100, the user may use the mobile device 300 to determine the desired configuration of the system 100 and the controller 200 and transmit the configuration (e.g., configuration files, controller settings, and the like) to the controller 200 using the NFC wireless communications interfaces 314 and 214. After the controller 200 is installed and configured, the mobile device may be used to change the configuration or retrieve current configuration data, error data, troubleshooting data, operational history data, and the like from the controller 200 to using the NFC wireless communications interfaces 314 and 214.

An installer may retrieve data from the controller 200 via the NFC wireless communication interface before installing and/or configuring the controller 200. For example, the installer may identification information about the controller, the currently programmed settings, the status of input/outputs of the controller 200 (e.g., what is hooked up, are there problems, etc.), what other components are in the system, and the like. Thus, the installer may be able to obtain information to help guide the selection of the operational parameters to be configured (or determine if any changes are needed at all) or to select the operational parameters automatically (if enough information is obtained).

By including an NFC wireless communication interface 214 on the controller 200, an installer may use a software application on mobile device 300 to configure the controller 200. A series of menu items may be provided to the installer, who may follow the menu items to install the HVAC control. In various embodiments, a software application menu may list a plurality of HVAC control types that could be configured using the software application, and a user may select from the menu a type of control to configure.

Additionally or alternatively, when a software application on a user's mobile device 300 has been connected with the controller 200 via NFC, the software application may query the HVAC controller 200 as to its type and thereafter automatically present the appropriate control configuration menu or preset (e.g., default) configuration settings to the user on the mobile device 300. In embodiments in which a controller 200 is to be configured as a replacement for an existing controller 200, a software application on a user mobile device 300 may query the existing controller to extract its programmable parameters, pre-populate selection criteria in the application with the extracted parameters, and download the selections to the replacement controller 200.

In some embodiments, a user may enter (e.g., by typing, by photographing, by barcode scanning, by RFID scanning, by voice command, or the like) a type and number for a particular HVAC controller 200 (which may be new or a replacement) into a software application on the user's mobile device 300, after which the application contacts a remote server (not shown) to obtain parameter selection criteria for the user-identified controller 200. As used herein, a "barcode" may be a one dimensional barcode (e.g., a UPC barcode) or a two dimensional barcode (e.g., a QR code). The server may fetch the parameter selection information from a database and send the values to the application for download to the controller 200. In some embodiments, the parameter selection criteria is stored ahead of time in the mobile device 300, and does not need to be retrieved from the remote server during setup. Thus, the mobile device 300 may determine settings (such as default settings) at least in part by retrieving them from a remote server or retrieving them from its own memory.

Moreover, in some embodiments, the user may enter (e.g., by typing, by photographing, by barcode scanning, by RFID scanning, by voice command, or the like) identifying information, such as a type, a size, and part number, or the like, for multiple components of the system 100, such as the controller, the motor(s), the external heat exchanger, duct sizes/lengths, the size of the outdoor unit, whether the system is just Air conditioner or Air conditioner/Heat pump, what SEER or efficiency, details about heat exchanger, and the like, into a software application on the user's mobile device 300. The application may then determine and/or retrieve configuration settings for the controller 200 to allow the controller to control the system 100. The retrieved configuration settings may then be transmitted, via NFC communication, to the controller 200. In some embodiments, the user may, if desired, modify the retrieved configuration settings and/or set additional settings before downloading the settings to the controller 200 via NFC communication.

Thus, in various embodiments, all configurable parameters may be automatically selected, and the installer or other user may modify one or more parameters based, e.g., on installation specifics. As one example, an installer might adjust a parameter for the speed of a circulator/blower, to suit the total duct length at an installation site. The installer might adjust one or more parameters for adjusting airflow. For example, in a system with a CFM based communicating motor, the installer may adjust an airflow command. In a system with a constant torque motor, the installer might adjust a torque command level based on which tap(s) of the motor (which typically includes five taps) are energized in order to achieve the desired airflow based on the system 100 configuration (e.g. the motor, duct length, indoor unit, the size of the outdoor unit, and the like). In other embodiments, less than all (including none) of the configurable parameters are automatically selected, and the installer or other user sets the parameters.

In some embodiments, the user inputs (e.g., via typing, capturing an image, barcode scanning, RFID reading, NFC communicating, or the like) details of the installation into an installation application on the mobile device 300. The details of the installation can include, the specific motors used in the system, the size of the outdoor unit(s), the length of ducts, and the like. The application retrieves (either from a remote server or from memory 304) information on the identified components of the system and determines the recommended settings for the controller 200 to operate the system 100, including timings, alarms, motor control settings such as motor speed, CFM, or torque settings, and the like. The installation details may also include the location of the installation and details of the building in which the installation occurs. This information may be input manually, of the mobile device may generate the information, such as by using an internal GPS sensor to determine the current location and retrieving data on the building at the current location (e.g., using public records or real estate directories). The data on the building at the current location may include, for example, the age of the building, the size of the building, the zoning of the building (commercial, residential, mixed, etc.), and/or any other suitable information.

As noted above, the motors used in the HVAC system, such as in the internal and external blowers, in pumps, compressors, and the like, may have different settings. For example, in some embodiments, one or more of motors are capable of operating at multiple speeds. The motors and their available speeds may be provided to the installer on the mobile device, to allow the installer to select the appropriate motor speeds during various operations, such as heating, cooling, circulating air, and the like. Similarly, motors that are operable at multiple torques, CFM settings, different PWM commands, or the like may have their respective options displayed for selection by the installer.

In various embodiments in which a replacement controller 200 is to be installed, a user may enter, e.g., by typing and/or by voice command, a part number of the old controller 200 into a software application on the mobile device 300. Additionally or alternatively, the user may use the mobile device 300 to take a picture of a label of the old controller 200. The software application may thereby recognize the old controller 200 automatically and access the default setting(s) for the old controller 200. This could be done also in relation to a product label and/or in relation to other part(s) of the system, e.g., to optimize most if not all settings.

Characters from a label may be recognized, and/or identifying information could be retrieved, e.g., from a bar code label, typed in or selected from a list, etc. The software application may use such label information, e.g., to query "the cloud" to retrieve default settings for the old control and automatically configure the default settings as selected settings for the replacement controller 200. The installer may accept the default settings if desired, and/or make any desired changes via the application to the settings, e.g., before the settings are loaded into the new replacement controller 200.

In some embodiments, actual settings of a new controller 200 may be stored based, e.g., on the location or address or serial number, as the new controller 200 is configured and installed. Such information could be saved for future use. In various embodiments, an installer may be directed graphically, e.g., by an application on the installer's mobile device 300, which could "walk" the installer through decision points in an installation process and let the installer decide each step.

For example, when replacing a controller, a first step might be, e.g., for the installer to: (a) type, speak, or otherwise enter into the application, control/product information for an existing controller 200 that is to be replaced, (b) take a picture of the label of the existing controller 200, or (c) skip to a following step. The following step might be for the installer to make a selection of what the existing controller 200 is to be replaced with. In various embodiments, the application might suggest a replacement controller 200 and provide a replacement control number.

The application may also suggest other or additional system part number(s)/control number(s) and/or parameters. The installer may accept defaults and/or change them. In various embodiments, the application may store default settings for a wireless-enabled control in the cloud, on a remote server, etc., so that when the controller 200 is replaced, the exact defaults can be loaded into the new controller 200. In other embodiments, the default settings may be stored in the mobile device 300 so that they can be accessed without needing to retrieve them from a remote server.

The mobile device 300 may also be configured to allow the installer to initiate a test cycle from the mobile device 300. Thus, the installer instruct (using the mobile device 300 communicating over the NFC communication to the controller 200) the controller 200 run a test cycle and report the results of the test cycle to the mobile device 300. The test cycle may be run before changing any parameters of the controller 200 or after changing one or more parameters to allow the installer to determine how well or if the current configuration is working and/or determine how well revised parameters are working.

In some embodiments, the mobile device is configured to provide tutorials, help, and/or documents related to the controller 200 (generally referred to as "help items"). The help items may be stored in the mobile device 300 or may be retrieved by the mobile device from a remote storage location, such as a remote server, a website on the internet, or the like.

The data retrieved and/or generated by the installer may also be transmitted to other users' mobile devices. The transmission may be direct, such as via NFC, Bluetooth, or Wi-Fi connection between two mobile devices, or indirect, such as by uploading the data to a remote server or website from which another user may download the data. This allows configuration parameters, error/fault information, and the like to be shared among different installers.

It should be noted generally that although some embodiments are described herein with reference to universal HVAC controllers, embodiments are also contemplated in relation to non-universal controllers. It also should be noted that unless otherwise indicated, terms such as "configuration," "set-up," "installation," "configuring," "setting up" and "installing" may be used interchangeably herein. Embodiments are contemplated relative to various parameters, commands, settings, etc., whereby climate control system controls may be operated and/or made operable. Further installation or installing a may include the initial installation of a system including the HVAC controller, replacing an existing HVAC controller with an HVAC controller as described herein, or installing/replacing/repairing other components of a system that includes an HVAC controller as described herein.

Figure 4:
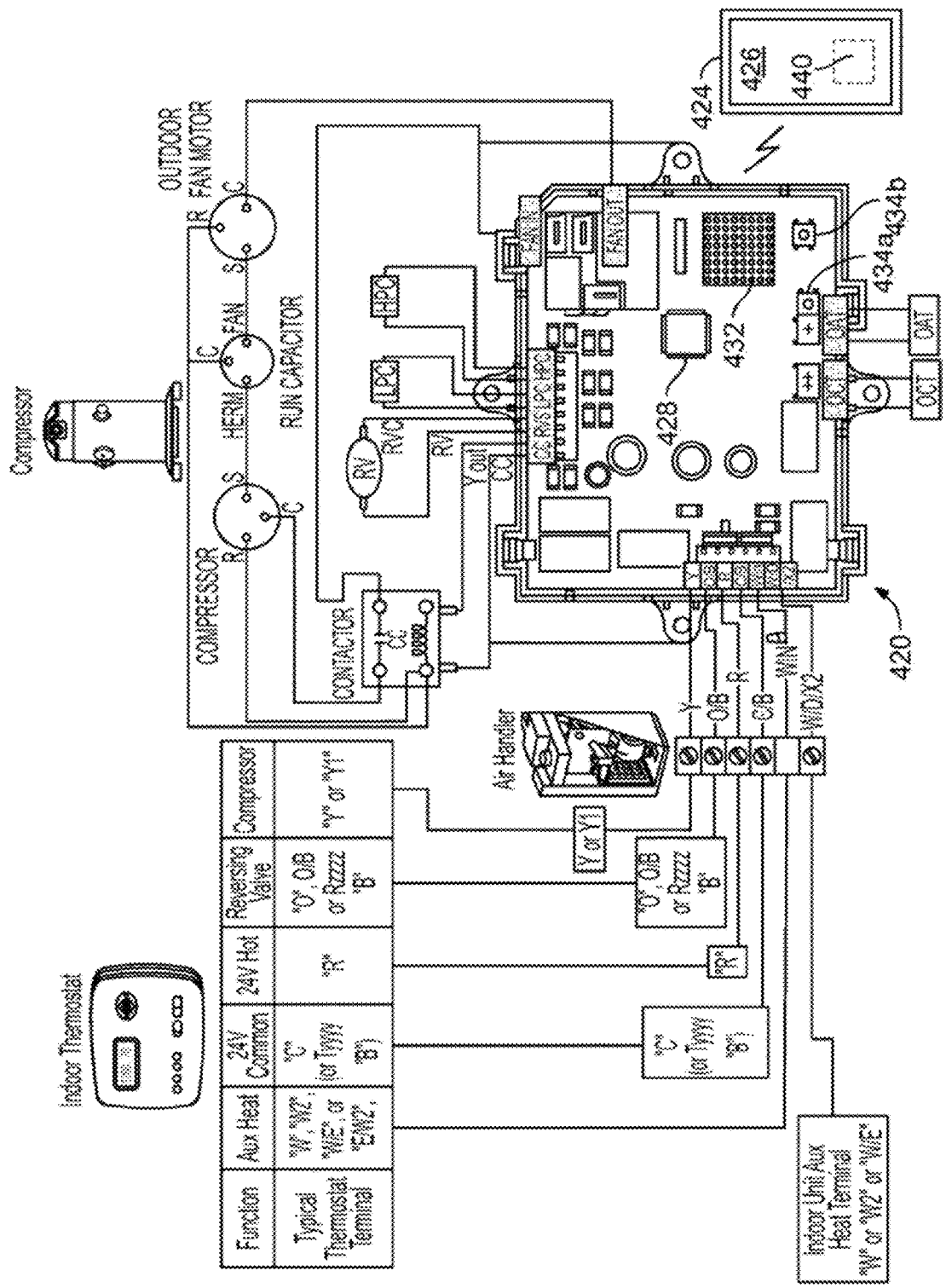
FIG. 4 illustrates an example universal heat pump defrost control and a mobile device.

Example implementations of the system 100 and example operation of features of the system 100 will be described below with reference for FIGS. 4-8. FIG. 4 illustrates an embodiment of an example universal heat pump defrost control 420 embodying one or more aspects of the present disclosure. The universal defrost control 420 may be used, e.g., as replacement for any one of a plurality of different defrost controls made by different manufacturers and that have different set-up parameters. Typically, after a defrost control has been wired into a climate control system, the installer determines which setup parameters to apply in the defrost control.

The defrost control 420 includes a microcontroller 428, which in the present example embodiment is a PIC24F-type microcontroller. The defrost control 420 also includes a display device 432, which in the present example embodiment is a dot matrix LED display controlled by the microcontroller 428. An "option" push button 434a and a "select" push button 434b may be used for selecting a menu on the LED display 432 and then setting or adjusting operational parameters for the selected menu.

Additionally or alternatively, the LED display 432 and push buttons 434a-434b may be used for recalling a fault. In various embodiments of the present disclosure, however, an installer may additionally or alternatively use a software application to make such determinations and to push appropriate setup parameters to the defrost control 420. For example, the defrost control 420 is wirelessly connectable with a mobile computing device 424, e.g., a smart phone, tablet, laptop, etc., (hereinafter referred to as "mobile device.") The mobile device 424 has a processor and memory 440 that includes and/or has access to a software application executable to configure the defrost control 420, e.g., as further described below. The mobile device 424 also has a display, e.g., a touchscreen 426, and, in various embodiments, a voice processing capability.

The example defrost control 420 and mobile device 424 are both NFC-enabled and may communicate with each other, e.g., via NFC communication interfaces. Communication between the defrost control 420 and the mobile device 424 via NFC communication may be established by running a software application on the mobile device 424 and placing the mobile device 424 in close proximity to the defrost control 420.

The user then may configure the control 420 using the software application and NFC connection. Because NFC only communicates when it is close, there are periods of communications and no communications. The user may change several things while not in communication, and then hit download, put the mobile device close to the control 420, and it downloads. In various embodiments, an installer may use the software application on the mobile device 424 to configure the universal defrost control 420 for operation in a particular climate control system. In some embodiments, the software application displays, on the mobile device touchscreen 426, a main menu having an item for "manufacturer selection." Additionally or alternatively, the software application may provide menu items audibly, from the mobile device 424 to an installer.

In the present example embodiment, the installer may select the "manufacturer selection" menu item to display a list of manufacturers (OEMs) that provide a defrost control as part of their equipment lineup. The installer may use the touchscreen 426 to select one of the manufacturers, e.g., by touching one of the OEM names displayed in the list, or by using a voice command, to transmit a selection of one of the manufacturers to the software application on the mobile device 424. In response to the installer's OEM selection, the software application may transmit parameter values corresponding to the selected OEM to the microcontroller 428 for populating parameters of the universal defrost control 420.

FIG. 5 illustrates an example list of OEMs 500 and corresponding defrost control parameters 508 for each OEM. Under "Defrost Type", "T/T" means time/temperature. When T/T defrosting is performed, an outdoor unit runs a fixed number of minutes in heat pump mode, then performs a defrost cycle (if the coil temperature is less than a threshold), and then returns to heat pump mode. "Demand" is a defrost method in which the unit only performs a defrost cycle when it is needed. This is typically done using two temperature sensors, one on the outdoor coil, the other sensing the outdoor temperature.

Referring to FIG. 4, for example, the universal defrost control 420 receives sensor input from a coil temperature sensor OCT and an outdoor ambient temperature sensor OAT. When the difference, during operation, of the coil temperature and the outdoor temperature exceeds a given value, e.g., 10° F., the unit performs a defrost cycle. This method works on the principle that frost forms an insulating barrier to the heat exchanger, and alters the typical delta between the coil and outdoor temperature.

In various embodiments, a software application on a mobile device is configured to assist an installer by displaying, speaking, and/or otherwise providing information pertinent, e.g., to selectable parameters. Additionally or alternatively, a software application on a mobile device may be configured to receive voice commands from an installer requesting and/or providing information to the software application. In various embodiments, a plurality of menu choices and submenu values may be provided on the touchscreen 426 for selection therefrom by the installer. The installer may use such menus to configure a defrost control "manually," i.e., without using parameters as may be automatically provided for a given OEM.

Additionally or alternatively, the installer may select from such menus in order to make adjustments to certain parameters. Example set-up features that may be provided as menu choices are listed and described in FIGS. 6A-6B. An example main menu screen, shown in FIG. 7A, includes most of the set-up parameters of FIGS. 6A-6B. As shown in FIG. 7A, parameters are characterized as "System Settings", "Temperature Settings", "Time Settings", and "Special Settings".

In various embodiments, the software application allows a given menu item to be selectable only if it is consistent with setting(s) previously selected by the installer. For example, because the first setting selection, "Defrost Type", has been set to "Demand", a setting applicable only to "T/T" defrost is not available for selection by the installer. Thus a "Time Settings" menu item for "Defrost Cycle Time" is set to "N/A". In this way, the installer may be guided to select only parameters as appropriate for the control being configured.

Figure 7B:
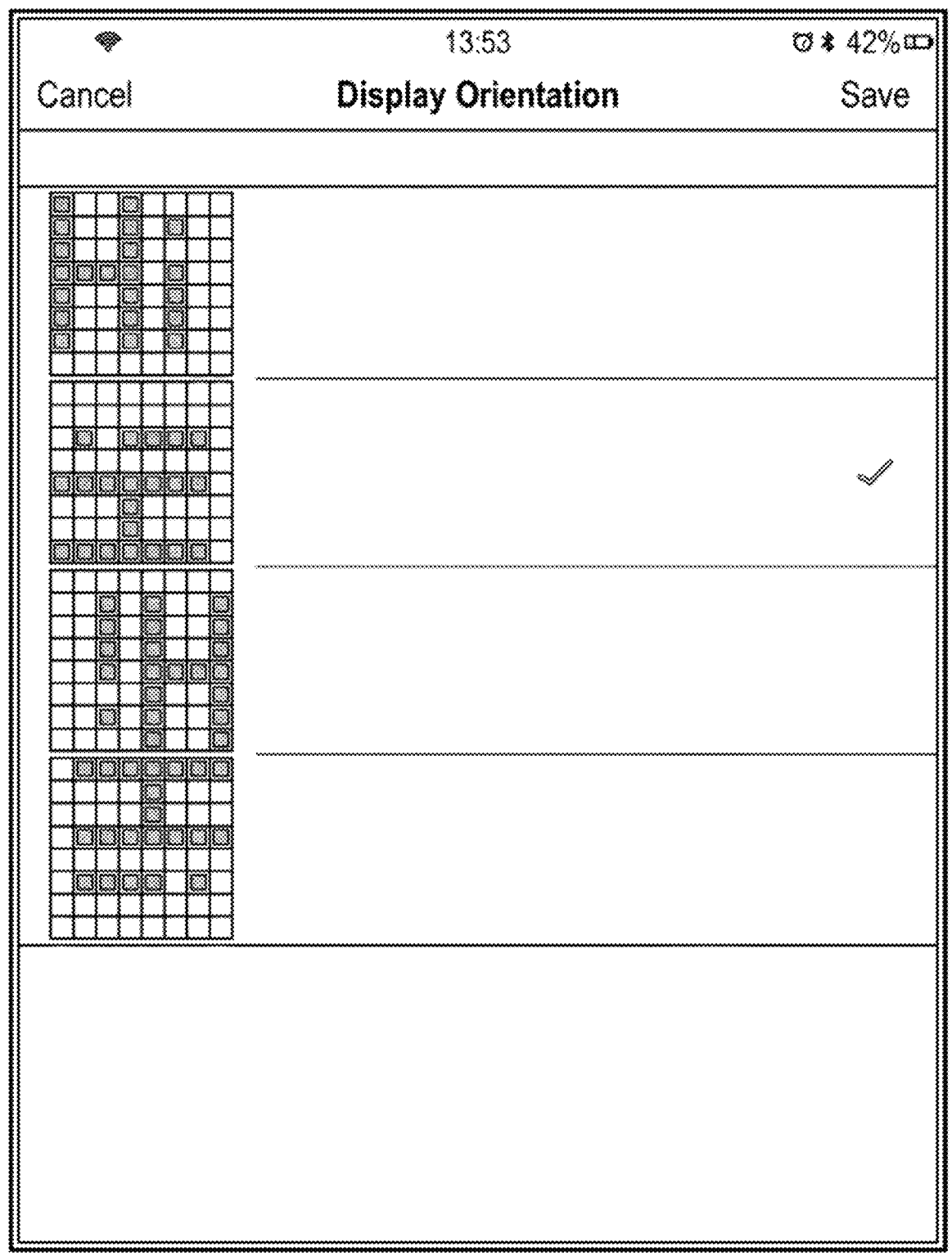

If the installer selects "Display Orientation" on the main menu, a display orientation selection screen is displayed, e.g., as shown in FIG. 7B. The installer then may select an orientation for displays on the defrost control LED display 432. Generally, a display can be difficult to read when the orientation of equipment holding the display is changed. For example, many furnaces can be installed up-flow, down-flow, or horizontally and may be field-convertible. As shown in FIG. 7B, the installer may select from four different orientations of the LED display 432, e.g., by touching the selected orientation on the touchscreen 426. The installer thus may change the orientation from the upright "Hi" orientation (shown in FIG. 7A as the current orientation) to one of the other three orientations if desired.

Figure 7C:
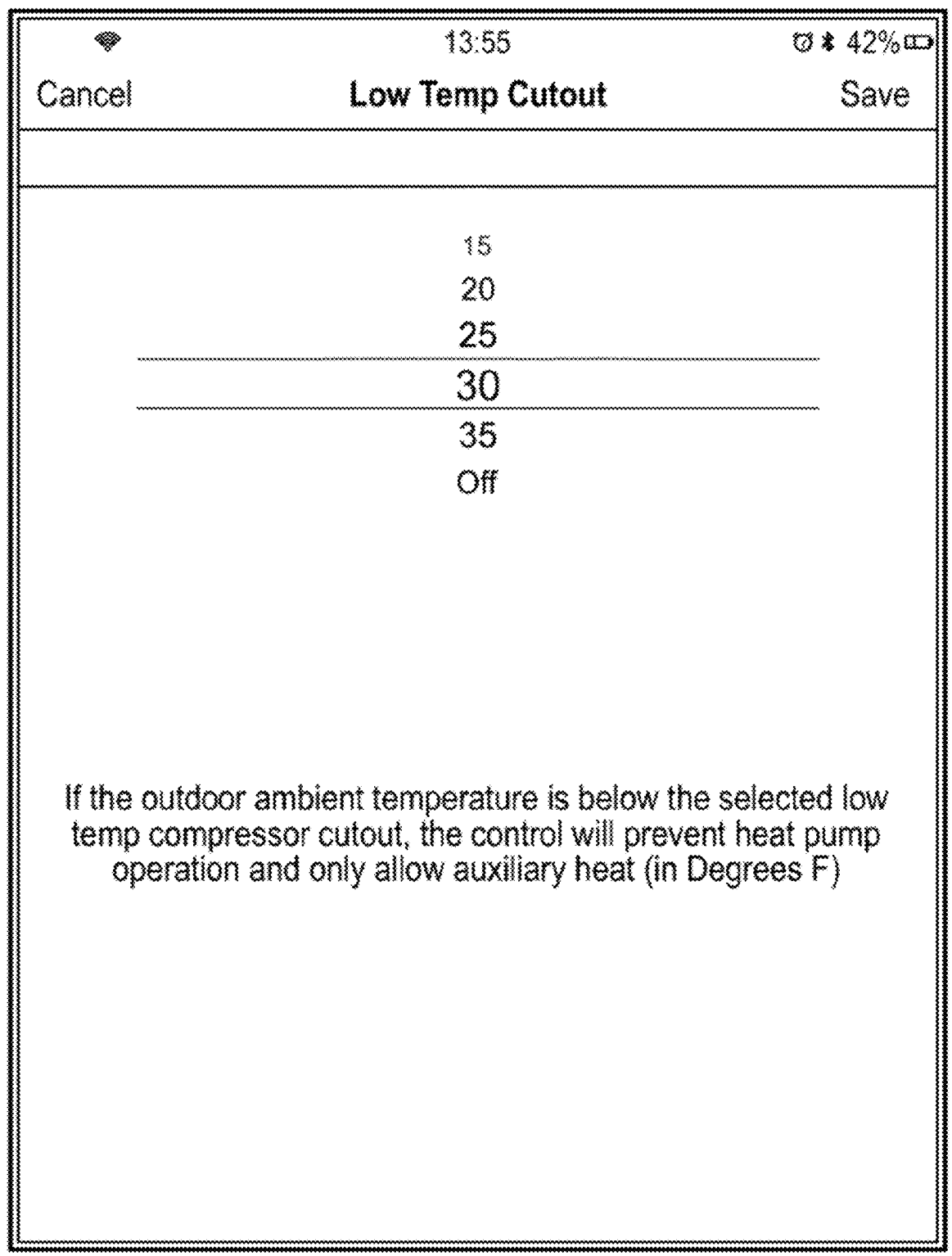

In various embodiments, the software application is configured to assist an installer by displaying information pertinent to selectable parameters. For example, if an installer selects "Low Temp Compressor Cutout" from the main menu of FIG. 7A, a selection screen may be displayed, e.g., as shown in FIG. 7C. A range of low temperatures is displayed from which the installer may select an outdoor temperature at which heat pump operation is prevented. In addition to the low temperature range, the selection screen of FIG. 7C displays a description of how the "Low Temp Compressor Cutout" parameter is used by the defrost control 420.

When the software application displays information or selections to the user on the user interface, the display may include multiple pages of display (accessed by scrolling, swiping, or selecting a next/previous page) and/or may include submenus accessed by selecting a menu item having such submenus.

Figure 7D:
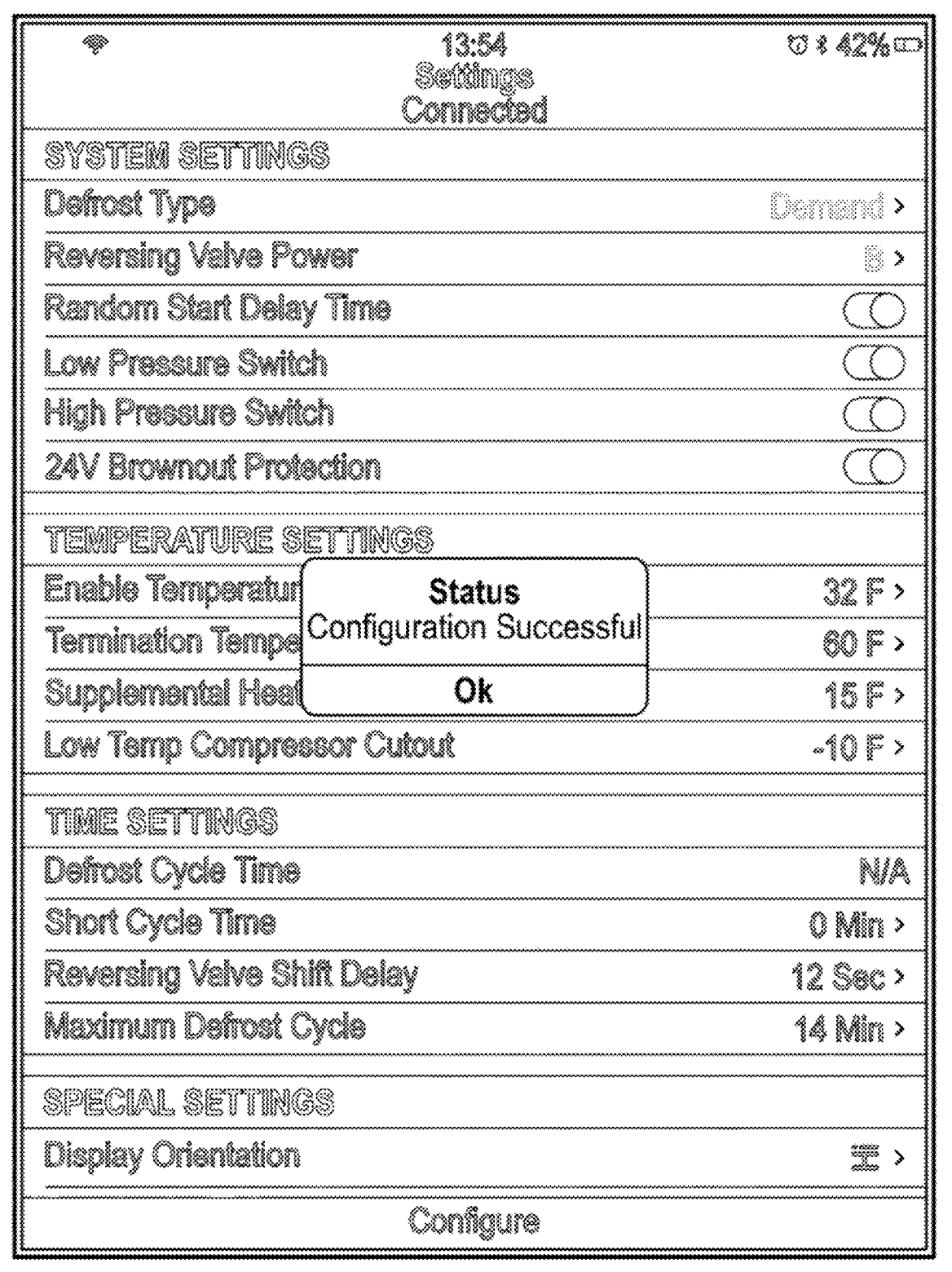

When the installer has completed parameter selection, the installer may touch "Configure" on the main menu screen, to instruct the software application to wirelessly push the selected parameters to the defrost control 420 when an NFC connection is established with the control 420. The installer places the mobile device near the control 420 to establish the NFC connection, and the parameters are pushed to the defrost control 420. A status screen may then be displayed, e.g., as shown in FIG. 7D. In various embodiments, if configuration was not successful, the software application may communicate with the defrost control microcontroller 428 to determine and display any errors.

Figure 8:
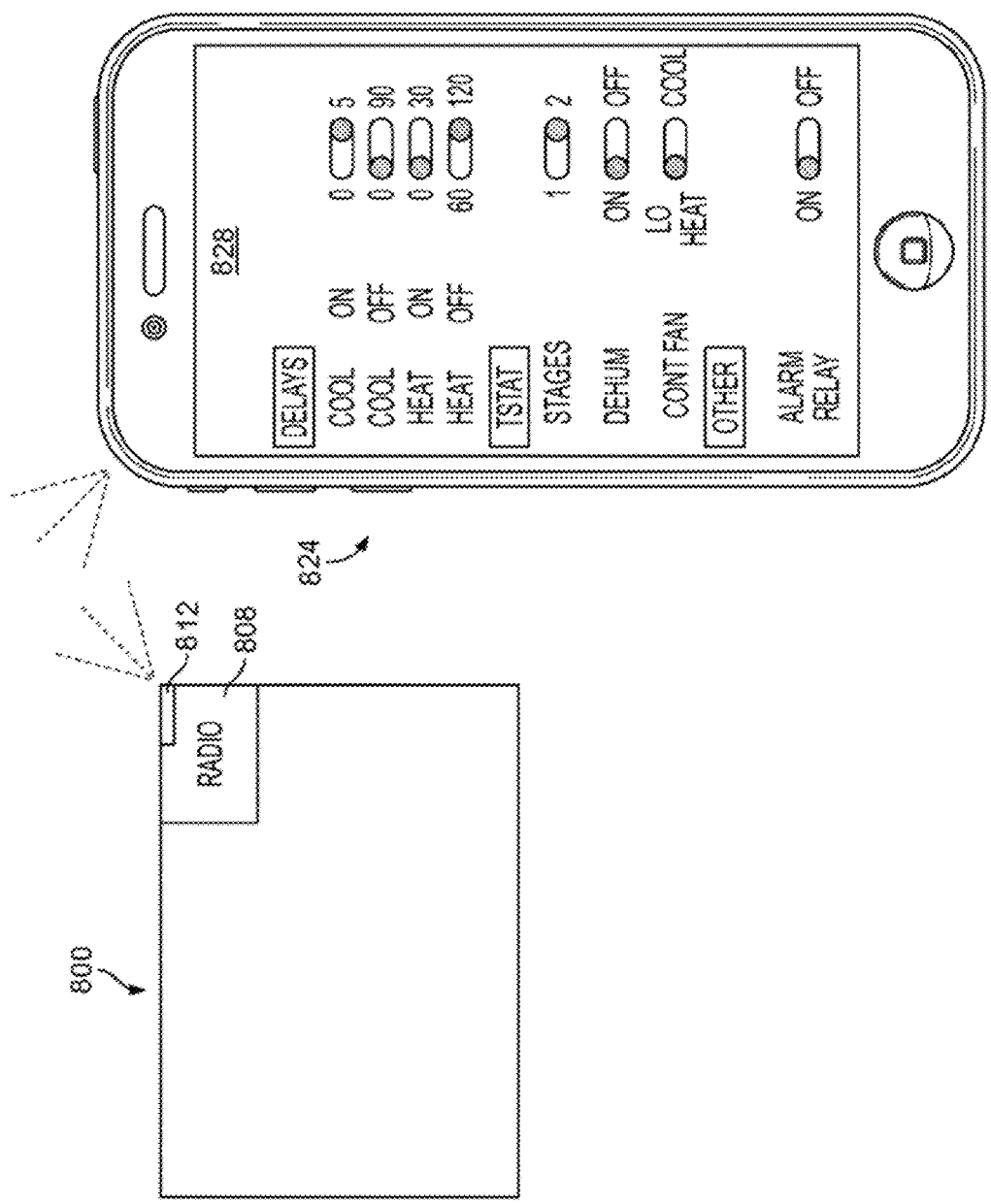
FIG. 8 is a diagram of an example integrated furnace control (IFC) and a user mobile device configured to provide setup parameters to the IFC.

Another example embodiment of a control is shown in FIG. 8. An example integrated furnace control ("IFC") 800 includes a microprocessor with memory, a radio 808, and an antenna 812 configured for wireless communication via NFC, with a mobile device 824, e.g., a phone or tablet having a display screen 828. On the mobile device display screen 828 is displayed an example menu of heating and cooling delays, thermostat settings, and other settings, such as an alarm relay setting. The various settings are selectable, e.g., by an installer of the IFC 800.

In another example embodiment, an HVAC system includes at least one HVAC component, and an HVAC control configured to control the at least one HVAC component according to one or more HVAC system configuration parameters. The HVAC control includes a controller NFC wireless interface and a memory. The system also includes a mobile device having a user interface and a mobile NFC wireless interface in wireless communication with the controller NFC wireless interface of the HVAC control.

The mobile device is configured to display the one or more HVAC system configuration parameters on the user interface, receive user input settings for the one or more HVAC system configuration parameters, and wirelessly transmit the received user input settings for the one or more HVAC system configuration parameters to the controller NFC wireless interface of the HVAC control via NFC communication.

The HVAC control is configured to store the received user input settings for the one or more HVAC system configuration parameters in the memory of the HVAC control to control the at least one HVAC component according to the received user input settings for the one or more HVAC system configuration parameters. The HVAC control includes a control board and the controller NFC wireless interface includes an NFC communication interface. The mobile device may include a mobile phone, a tablet computer, etc. The user interface of the mobile device may be configured to display selection information corresponding to each of the one or more HVAC system configuration parameters indicative of effects of different selection options for said HVAC system configuration parameters on performance of the HVAC system.

The user interface of the mobile device may be configured to receive at least one of an installation date, a location and an installer name. In that case, the mobile device is configured to wireless transmit the received at least one of an installation date, a location and an installer name to the controller NFC wireless interface of the HVAC control, and the HVAC control is configured to store the received at least one of an installation date, a location and an installer name in the memory.

The HVAC system may include at least one of a wireless air temperature sensor, a wireless coil temperature sensor and a wireless humidity sensor, and the mobile device can be configured to wirelessly transmit one or more setting parameters of the wireless air temperature sensor, the wireless coil temperature sensor and/or the wireless humidity sensor to the controller NFC wireless interface of the HVAC control. In some cases, the mobile device is configured to wirelessly transmit a software update to the controller NFC wireless interface of the HVAC control via NFC communication, and the HVAC control is configured to store the received software update in memory.

In some embodiments, the HVAC control is configured to wirelessly transmit at least one of a fault code and operational data to the mobile NFC wireless interface of the mobile device via NFC communication, and the mobile device is configured to display the received fault code and/or operational data on the user interface. For example, the operational data may include, but is not limited to, flame sense readings over time, air temperature readings over time, coil temperature readings over time, a defrost cycle, a serial number, a model number, an installation date, runtime data, a geographical location, etc.

The mobile device may be configured to determine a model number identifier of the HVAC control and to display installation information corresponding to the HVAC control in response to the determined model number identifier of the HVAC control. In some cases, the HVAC control is configured to wirelessly transmit, using NFC communication, settings of the one or more HVAC system configuration parameters that are currently stored in the memory of the HVAC control to the mobile NFC wireless interface of the mobile device.

According to another example embodiment of the present disclosure, an HVAC system includes at least one HVAC component, and an HVAC control configured to control the at least one HVAC component according to one or more HVAC system configuration parameters. The HVAC control includes a controller NFC wireless interface and a memory.

The HVAC system also includes a mobile device having a user interface, a camera, and a mobile NFC wireless interface configured for wireless communication using NFC communication with the controller NFC wireless interface of the HVAC control. The mobile device is configured to obtain an identity of the HVAC control which identity is determined by parsing an image of a label of the HVAC control as captured by the camera or by receiving a model number of the HVAC control entered into the user interface.

For example, the mobile device may be configured to determine the identity of the HVAC control by the mobile device parsing the image of the label of the HVAC control as captured by the camera or by the mobile device receiving the model number of the HVAC control entered into the user interface. Alternatively, or in addition, a remote device (e.g., a remote server) could determine the identity of the HVAC control, etc.

The mobile device is also configured to cause default settings for the one or more HVAC system configuration parameters from a remote server based on the identified HVAC control to be wirelessly transmitted to the controller NFC wireless interface of the HVAC control. For example, the mobile device may be configured to obtain the default settings for the one or more HVAC system configuration parameters from the remote server based on the identified HVAC control, and wirelessly transmit the settings for the one or more HVAC system configuration parameters to the controller NFC wireless interface of the HVAC control using NFC communication. Alternatively, or in addition, a remote device (e.g., a remote server) could wirelessly transmit the settings to the HVAC control, etc.

The HVAC control is configured to store the received settings for the one or more HVAC system configuration parameters in the memory of the HVAC control to control the at least one HVAC component according to the received settings for the one or more HVAC system configuration parameters.

In this example embodiment, the label may include at least one of a product label of the HVAC control and a barcode label of the HVAC control, and the mobile device may be configured to parse the image by recognizing characters in the product label and/or the barcode label. Alternatively, or additionally, the mobile device may be configured to receive the model number of the HVAC control by displaying a list of possible HVAC control model numbers and receiving a user selection from the displayed list.

In some cases, the mobile device is configured to display the received default settings from the remote server on the user interface of the mobile device, receive adjustments to the default settings via user input at the user interface, and wirelessly transmit the adjusted settings to the controller NFC wireless interface of the HVAC control using NFC communication. In that case, the mobile device may be configured to save the adjusted settings along with at least one of a location, and address and a serial number of the HVAC control. The mobile device may be configured to determine a suggested replacement HVAC control based on the identified HVAC control, and display the suggested replacement HVAC control on the user interface.

According to another example embodiment of the present disclosure, a method of controlling an HVAC system including an HVAC component is disclosed. The method includes controlling, by the HVAC control, the at least one HVAC component according to one or more HVAC system configuration parameters, displaying the one or more HVAC system configuration parameters on a user interface of the mobile device and receiving, via the user interface, user input settings for the one or more HVAC system configuration parameters.

The method also includes wirelessly transmitting, using an NFC communications interface, the received user input settings for the one or more HVAC system configuration parameters from the mobile device to a controller NFC wireless interface of the HVAC control, and storing the received user input settings for the one or more HVAC system configuration parameters in a memory of the HVAC control to control the at least one HVAC component according to the received user input settings for the one or more HVAC system configuration parameters.

In some embodiments, the method may include identifying, by the mobile device, the HVAC control by parsing an image of a label of the HVAC control as captured by a camera on the mobile device, or by receiving a model number of the HVAC control entered into the user interface, and obtaining default settings for the one or more HVAC system configuration parameters from a remote server based on the identified HVAC control.

According to another example embodiment, an HVAC control includes a control interface in communication with at least one HVAC component to control the at least one HVAC system according to one or more HVAC system configuration parameters, a controller NFC wireless interface configured for wireless communication with a mobile NFC wireless interface of a mobile device, and a memory.

The HVAC control is configured to wirelessly receive user input settings for the one or more HVAC system configuration parameters from the mobile device via the controller NFC wireless interface of the HVAC control. The HVAC control is also configured to store the received user input settings for the one or more HVAC system configuration parameters in the memory of the HVAC control to control the at least one HVAC component according to the received user input settings for the one or more HVAC system configuration parameters.

Example HVAC controls and mobile devices described herein may be configured to perform operations using any suitable combination of hardware and software. For example, the HVAC controls and mobile devices may include any suitable circuitry, logic gates, microprocessor (s), computer-executable instructions stored in memory, etc., operable to cause the HVAC controls and mobile devices to perform actions described herein (e.g., controlling an HVAC component, wirelessly transmitting settings, etc.).

In various embodiments in which an installer's mobile device includes voice processing capability, an installer may issue voice commands to the mobile device. In some embodiments, a software application on the mobile device processes a voice command from the installer and transmits a corresponding digital command wirelessly to a climate control system control via NFC.

The HVAC control may wirelessly transmit a response to the software application, in which case the software application provides a corresponding voice response to the installer on the mobile device. Thus, for example, an installer may issue voice commands via a smart phone to an IFC to set up and configure the IFC, to troubleshoot, and/or to obtain diagnostics regarding the IFC. The installer may speak into the smart phone, e.g., to ask, "What is the flame sense reading?" and the IFC may wirelessly transmit a response, e.g., "0.2 micro Amps," which is spoken to the installer by the smart phone. As another example, an installer may issue a voice command to an IFC to turn on the circulator for a test. The installer thus is provided with a convenient way to test the circulator, without having to open up the unit and use a jumper wire.

As still another example, an installer could issue a voice command to a heat pump defrost control to "run a forced defrost." Generally, it should be understood that the processing of mobile device commands and/or climate control system control responses (whether given by voice or otherwise) could be distributed in various ways, e.g., between a given mobile device and a given climate control system control.

Embodiments of the disclosure can facilitate an installer's configuration of controls. Installation can take less time and can be less error-prone than when installation is performed manually. Rather than having to set multiple dipswitches, or navigating through a long menu that uses LEDs and push buttons, an installer can configure all necessary settings using a software application, and then push the data to the control. The software application can provide more detail on available configuration selections to help a service technician make better choices.

For example, before a user chooses a defrost enable temperature, the user may access an explanation by the software application of the impact(s) of making different available selections. Wireless alarms and sensors for air temperature, coil temperature, humidity, etc., and more, could be easily added, in contrast to the difficulty or impossibility of adding alarms and/or system sensors where hard wiring is a requirement. Installation date, location, installer name, and other data could be loaded to the control for future warranty tracking and analysis.

Various embodiments can provide advantages relating to control servicing. For example, software updates could be pushed to the control in the field using NFC. Fault codes and/or other operational data could be received from the control without having to open up the unit. This may reduce (e.g., eliminate) miscounting of the blinks of an LED. Fault codes can include information on the basic system items to check out for any given code, like an embedded fault tree.

System data could be logged and sent to the application on the mobile device for analysis during a service call. Examples might be flame sense readings over time, aft and coil temperature readings over time or during an event, such as a defrost cycle. A service technician could work in a comfortable space to do the necessary configuration work, e.g., before going to the unit for upload. For example, the technician would not have to stand outside on a 10-degree day while configuring a new heat pump control. Software application embodiments can also provide much of the data typically found in a printed installation manual, e.g., once the individual control is identified by its model number.

Various embodiments can provide advantages relating to control replacement. For example, an original equipment manufacturer (OEM) of a given control can add items to be configured on the control, without worrying that the control might become too complex for an average service technician to work on.

In various embodiments, configuration settings from the existing control can be uploaded and transferred to the replacement control. Unit serial number, model number, installation dates, installer name, lifetime heating/cooling/defrost/other cycles, runtime data, geographical location and more could be pulled from the control for improved warranty reporting and analysis. Warranty-supporting information is often unavailable for many existing controls, since there typically is no way to upload such information to the controls. Unlike most standard controls, software on the foregoing control embodiments can be updated in the field, if needed. Supporting documentation for a given control embodiment can be stored, instead of becoming lost or unreadable over time from age.

Example embodiments of systems and methods for configuring an HVAC system are described above in detail. The system is not limited to the specific embodiments described herein, but rather, components of the system may be used independently and separately from other components described herein. For example, the controller and processor described herein may also be used in combination with other systems and methods, and are not limited to practice with only the system as described herein.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. An HVAC system comprising:
   at least one motor having a plurality of speeds at which it can operate;
   an HVAC control, the HVAC control configured to control the motor during a plurality of different operations, the HVAC control including a controller processor, a controller memory, and a controller near field communication (NFC) wireless interface, the controller NFC wireless interface including an NFC processor, an NFC memory, and an antenna; and
   a mobile device, the mobile device including a user interface and a mobile NFC wireless interface configured for wireless communication with the controller NFC wireless interface of the HVAC control when the mobile NFC wireless interface is in close proximity to the controller NFC wireless interface, wherein:
   the mobile device is configured to display the plurality of different operations on the user interface, receive user input settings of speeds of the plurality of different speeds of the motor for each of the plurality of different operations, and wirelessly transmit the received user input settings to the controller NFC wireless interface of the HVAC control;
   the NFC processor is configured to store the received user input settings in the NFC memory to allow the HVAC control to control the motor according to the received user input settings;
   the NFC memory stores an HVAC control password;

the mobile device is configured to wirelessly transmit a mobile device password to the controller NFC wireless interface of the HVAC control;

the NFC processor is configured to store the received user input settings in the NFC memory to allow the HVAC control to control the motor according to the received user input settings when the mobile device password matches the HVAC control password; and the NFC processor is configured not to store the received user input settings in the NFC memory when the mobile device password does not match the HVAC control password.

2. The HVAC system of claim 1, wherein the controller processor is configured to generate the HVAC control password and store the HVAC control password in the NFC memory.

3. The HVAC system of claim 2, wherein the controller processor is configured to generate the HVAC control password based on an identifier of the HVAC control.

4. The HVAC system of claim 3, wherein the identifier comprises one of a serial number of the HVAC control, a model number of the HVAC control, or a part number of the HVAC control.

5. The HVAC control of claim 1, wherein the mobile device is configured to determine the mobile device password.

6. The HVAC system of claim 5, wherein the mobile device is configured to generate the mobile device password based on an identifier of the HVAC control.

7. The HVAC system of claim 6, wherein the identifier comprises one of a serial number of the HVAC control, a model number of the HVAC control, or a part number of the HVAC control.

8. The HVAC system of claim 1, further comprising at least one additional HVAC component, wherein:

the HVAC control is configured to control the at least one additional HVAC component according to one or more HVAC system configuration parameters; and the mobile device is configured to display the one or more HVAC system configuration parameters on the user interface, receive user input settings for the one or more HVAC system configuration parameters, and wirelessly transmit the mobile device password and the received user input settings for the one or more HVAC system configuration parameters to the controller NFC wireless interface of the HVAC control;

the NFC processor is configured to store the received user input settings for the one or more HVAC system configuration parameters in the NFC memory to allow the HVAC control to control the at least one additional HVAC component according to the received user input settings for the one or more HVAC system configuration parameters when the mobile device password matches the HVAC control password; and the NFC processor is configured not to store the received user input settings for the one or more HVAC system configuration parameters in the NFC memory when the mobile device password does not match the HVAC control password.

9. The HVAC system of claim 1, wherein the mobile device includes at least one of a mobile phone and a tablet computer.

10. The HVAC system of claim 1, further comprising at least one additional HVAC component, wherein:

the HVAC control is configured to control the at least one additional HVAC component according to one or more HVAC system configuration parameters; and the mobile device is configured to display the one or more HVAC system configuration parameters on the user interface, receive user input settings for the one or more HVAC system configuration parameters, and wirelessly transmit the received user input settings for the one or more HVAC system configuration parameters to the controller NFC wireless interface of the HVAC control; and the NFC processor is configured to store the received user input settings for the one or more HVAC system configuration parameters in the NFC memory to allow the HVAC control to control the at least one additional HVAC component according to the received user input settings for the one or more HVAC system configuration parameters.

11. An HVAC system comprising:

at least one HVAC component;

an HVAC control, the HVAC control configured to control the at least one HVAC component according to one or more HVAC system configuration parameters, the HVAC control including a controller processor, a controller memory, and a controller near field communication (NFC) wireless interface, the controller NFC wireless interface including an NFC processor, an NFC memory, and an antenna; and a mobile device, the mobile device including a user interface, a camera, and a mobile NFC wireless interface configured for wireless communication with the controller NFC wireless interface of the HVAC control when the mobile NFC wireless interface is in close proximity to the controller NFC wireless interface, wherein:

the mobile device is configured to obtain an identity of the HVAC control which identity is determined by parsing an image of a label of the HVAC control as captured by the camera or by receiving a model number of the HVAC control entered into the user interface;

the mobile device is configured to determine default settings for the one or more HVAC system configuration parameters based on the identified HVAC control to be wirelessly transmitted to the controller NFC wireless interface of the HVAC control;

the NFC processor is configured to store the received settings for the one or more HVAC system configuration parameters in the NFC memory to permit the HVAC control to control the at least one HVAC component according to the received settings for the one or more HVAC system configuration parameters;

the mobile device is configured to determine a mobile device password based on the identity of the HVAC control and transmit the mobile device password to the HVAC control; and an HVAC control password is stored in the NFC memory, and the NFC processor is configured not to store the received settings for the one or more HVAC system configuration parameters in the NFC memory when the mobile device password does not match the HVAC control password.

12. The HVAC system of claim 11, wherein the label includes at least one of a product label of the HVAC control and a barcode label of the HVAC control, and the mobile device is configured to parse the image by recognizing characters or images in the product label and/or by recognizing the barcode label.

13. The HVAC system of claim 11, wherein the mobile device is configured to receive the model number of the HVAC control by displaying a list of possible HVAC control model numbers and receiving a user selection from the displayed list.

14. The HVAC system of claim 11, wherein the mobile device is configured to:
   display the received default settings from a remote server on the user interface of the mobile device;
   receive adjustments to the default settings via user input at the user interface; and
   wirelessly transmit the adjusted settings to the controller NFC wireless interface of the HVAC control.

15. The HVAC system of claim 14, wherein the mobile device is configured to save the adjusted settings along with at least one of a location, and address and a serial number of the HVAC control.

16. The HVAC system of claim 11, wherein the mobile device is configured to determine a suggested replacement HVAC control based on the identified HVAC control, and display the suggested replacement HVAC control on the user interface.

17. The HVAC system of claim 11, wherein the controller processor is configured to copy the received settings for the one or more HVAC system configuration parameters stored in the NFC memory to the controller memory and to control the at least one HVAC component according to the copied one or more HVAC system configuration parameters stored in the controller memory.

* * * * *